United States Patent
Itzhaky et al.

(10) Patent No.: US 10,349,584 B2
(45) Date of Patent: Jul. 16, 2019

(54) SYSTEM AND METHOD FOR PLANT MONITORING

(71) Applicant: Prospera Technologies, Ltd., Tel-Aviv (IL)

(72) Inventors: Raviv Itzhaky, Maale Adumim (IL); Daniel Koppel, Raanana (IL); Simeon Shpiz, Bat Yam (IL)

(73) Assignee: Prospera Technologies, Ltd., Tel-Aviv (IL)

( * ) Notice: Subject to any disclaimer, the term of this patent is extended or adjusted under 35 U.S.C. 154(b) by 728 days.

(21) Appl. No.: 14/950,594

(22) Filed: Nov. 24, 2015

(65) Prior Publication Data

US 2016/0148104 A1 May 26, 2016

Related U.S. Application Data

(60) Provisional application No. 62/083,492, filed on Nov. 24, 2014.

(51) Int. Cl.
*A01G 7/00* (2006.01)
*G06N 3/04* (2006.01)
*G06N 3/08* (2006.01)

(52) U.S. Cl.
CPC ............ *A01G 7/00* (2013.01); *G06N 3/0454* (2013.01); *G06N 3/08* (2013.01)

(58) Field of Classification Search
CPC combination set(s) only.
See application file for complete search history.

(56) References Cited

U.S. PATENT DOCUMENTS

| | | | |
|---|---|---|---|
| 6,397,162 B1 | 5/2002 | Ton | |
| 6,701,665 B1 | 3/2004 | Ton et al. | |
| 7,031,927 B1 | 4/2006 | Beck et al. | |
| 7,184,965 B2 | 2/2007 | Fox et al. | |
| 7,194,369 B2 * | 3/2007 | Lundstedt | G01N 21/274 702/104 |
| 7,305,280 B2 | 12/2007 | Marian | |
| 7,657,124 B2 | 2/2010 | Turner et al. | |
| 7,742,862 B2 | 6/2010 | Anderson et al. | |
| 7,752,106 B1 | 7/2010 | Corby et al. | |
| 7,844,517 B2 | 11/2010 | Willen et al. | |

(Continued)

FOREIGN PATENT DOCUMENTS

WO 2002084248 A2 10/2002

OTHER PUBLICATIONS

ScienceDirect Elsevier Mechanical Systems and Signal Processing vol. 21, Issue 6, Aug. 2007, pp. 2560-2574 Support vector machine in machine condition monitoring and fault diagnosis, Achmad Widodo, Bo-Suk Yang.*

(Continued)

*Primary Examiner* — Michael B Holmes
(74) *Attorney, Agent, or Firm* — M&B IP Analysts, LLC

(57) ABSTRACT

A system and method for automatic plant monitoring. The method comprises: identifying at least one test input respective of a test area, wherein the test area includes at least one part of a plant; and generating a plant condition prediction based on the at least one test input and on a prediction model, wherein the prediction model is based on a training set including at least one training input and at least one training output, wherein each training output corresponds to a training input.

25 Claims, 10 Drawing Sheets

(56) References Cited

U.S. PATENT DOCUMENTS

| | | | |
|---|---|---|---|
| 7,930,085 B2 | 4/2011 | Anderson et al. | |
| 8,010,309 B2* | 8/2011 | Lundstedt | G01N 21/274 702/104 |
| 2002/0170229 A1 | 11/2002 | Ton et al. | |
| 2003/0154044 A1* | 8/2003 | Lundstedt | G01N 21/274 702/104 |
| 2007/0143037 A1* | 6/2007 | Lundstedt | G01N 21/274 702/30 |
| 2011/0054864 A1* | 3/2011 | Lundstedt | G01N 21/274 703/2 |
| 2014/0117108 A1 | 5/2014 | Hong | |
| 2016/0148104 A1* | 5/2016 | Itzhaky | A01G 7/00 706/12 |
| 2017/0039425 A1* | 2/2017 | Itzhaky | G06K 9/00657 |
| 2017/0161560 A1* | 6/2017 | Itzhaky | A01G 22/00 |
| 2017/0243340 A1* | 8/2017 | Itzhaky | G06T 7/0004 |
| 2017/0249733 A1* | 8/2017 | Itzhaky | G06K 9/00657 |
| 2017/0273258 A1* | 9/2017 | Itzhaky | A01G 25/167 |
| 2017/0367276 A1* | 12/2017 | Itzhaky | A01G 25/16 |

OTHER PUBLICATIONS

ScienceDirect Elsevier Expert Systems with Applications vol. 41, Issue 10, Aug. 2014, pp. 4891-4903, Condition monitoring of induction motors: A review and an application of an ensemble of hybrid intelligent models, Manjeevan Seera, Chee Peng Lim, Saeid Nahavandi, Chu Kiong Loo.*

ScienceDirect Trends in Plant Science vol. 19, Issue 12, Dec. 2014, pp. 798-808 Machine learning for Big Data analytics in plants Chuang Ma, Hao Helen Zhang, Xiangfeng Wang.*

ScienceDirect Elsevier Computers in Industry vol. 62, Issue 1, Jan. 2011, pp. 42-50 Using SVM based method for equipment fault detection in a thermal power plant Kai-Ying Chen, Long-Sheng Chen, Mu-Chen Chen, Chia-Lung Lee.*

* cited by examiner

SYSTEM AND METHOD FOR PLANT MONITORING

CROSS-REFERENCE TO RELATED APPLICATIONS

This application claims the benefit of U.S. Provisional Application No. 62/083,492 filed on Nov. 24, 2014, the contents of which are hereby incorporated by reference.

TECHNICAL FIELD

The present disclosure relates generally to agricultural monitoring, and more specifically to using machine vision to monitor plants on farms.

BACKGROUND

Despite the rapid growth of the use of technology in many industries, agriculture continues to utilize manual labor to perform the tedious and often costly processes for growing vegetables, fruits, and other crops. One primary driver of the continued use of manual labor in agriculture is the need for guidance and consultation by experienced agronomists with respect to developing plants. In particular, such guidance and consultation is crucial to the success of larger farms.

Agronomy is the science of producing and using plants for food, fuel, fiber, and land reclamation. Agronomy involves use of principles from a variety of arts including, for example, biology, chemistry, economics, ecology, earth science, and genetics. Modern agronomists are involved in issues such as improving quantity and quality of food production, managing the environmental impacts of agriculture, extracting energy from plants, and so on. Agronomists often specialize in areas such as crop rotation, irrigation and drainage, plant breeding, plant physiology, soil classification, soil fertility, weed control, and insect and pest control.

The plethora of duties assumed by agronomists require critical thinking to solve problems. For example, when planning to improve crop yields, an agronomist must study a farm's crop production in order to discern the best ways to plant, harvest, and cultivate the plants, regardless of climate. Additionally, agronomists must develop methods for controlling weeds and pests to keep crops disease free. To these ends, the agronomist must continually monitor progress to ensure optimal results.

Pursuant to the need to monitor progress, agronomists frequently visit the fields in which crops are grown to assess the plant production and to identify and solve any problems encountered. Solving the crop problems may include, for example, updating the instructions for chemicals and/or fertilizers used on the crops, altering a watering schedule, removing harmful wildlife from the fields, and so on.

Agronomists often use mathematical and analytical skills in conducting their work and experimentation. Complex data resulting from such use must be converted into a format that is ready for public consumption. As a result, agronomists communicate their findings via a wide range of media, including written documents, presentations, speeches, and so on. Such communication must further take diplomacy into consideration, particularly when the communication involves sensitive matters.

Reliance on manual observation of plants to identify and address problems is time-consuming, expensive, and subject to human error. Additionally, even when agronomists frequently observe the plants, problems may not be identified immediately. Such stalled identification leads to slower response times. As a result, the yield of such plants may be sub-optimal, thereby resulting in lost profits.

It would therefore be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

The disclosed embodiments include a method for plant monitoring. The method comprises identifying at least one test input respective of a test area, wherein the test area includes at least one part of a plant; and generating a plant condition prediction based on the at least one test input and on a prediction model, wherein the prediction model is based on a training set including at least one training input and at least one training output, wherein each training output corresponds to a training input.

The disclosed embodiments also include a system for plant monitoring. The system comprises a processing unit; and a memory, the memory containing instructions that, when executed by the processing unit, configure the system to: identify at least one test input respective of a test area, wherein the test area includes at least one part of a plant; and generate a plant condition prediction based on the at least one test input and on a prediction model, wherein the prediction model is based on a training set including at least one training input and at least one training output, wherein each training output corresponds to a training input.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
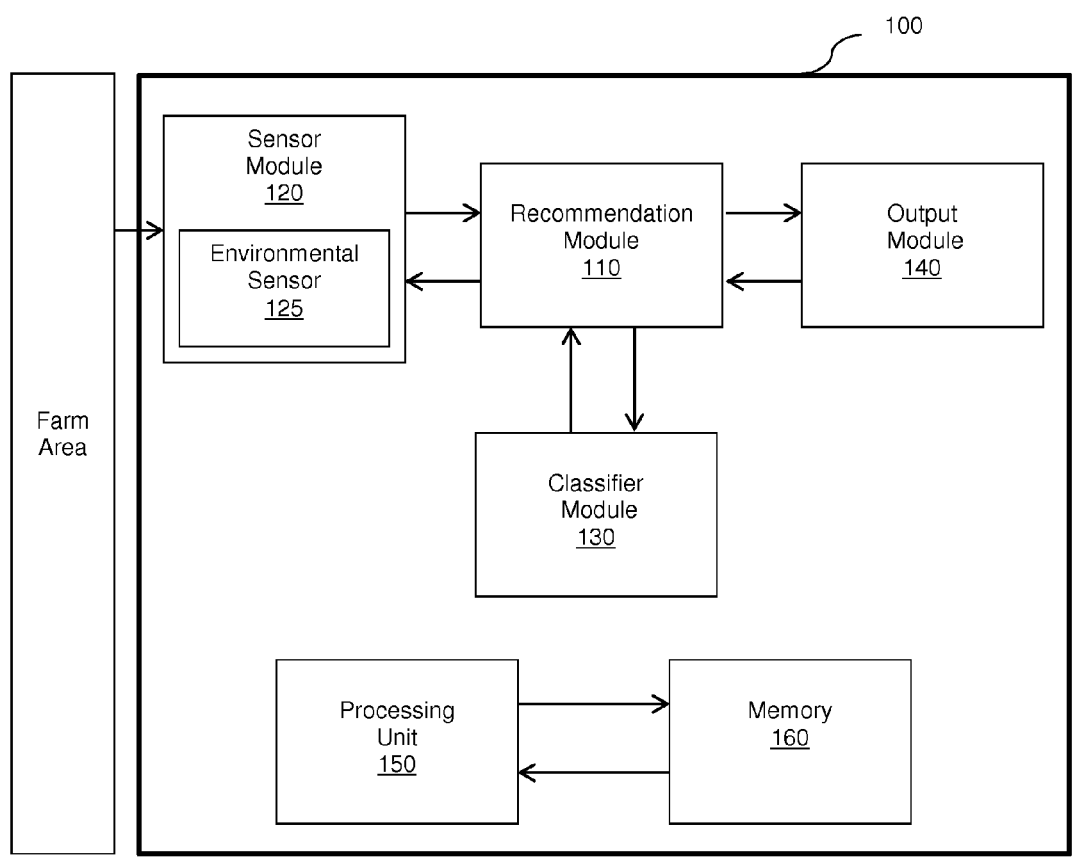
FIG. 1 is a schematic diagram of a system for automatic plant monitoring utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The disclosed embodiments include a method and system for automatic plant monitoring. A set of training information is obtained and analyzed. A predictive function is generated based on the training set. A set of test inputs is obtained and analyzed. Based on the test inputs and the predictive function, a prediction of one or more plant conditions may be determined. The prediction may be a disease prediction, deficiencies in elements such as Nitrogen (N) and Potassium (K), a harvest yield prediction, or a harvest time prediction.

FIG. 1 shows an exemplary and non-limiting schematic diagram of a system 100 for automatic plant monitoring utilized to describe the various disclosed embodiments. The system 100 includes a recommendation module 110, a sensor module 120, a classifier module 130, an output module 140, a processing unit 150, and a memory 160.

The recommendation module 110 may be configured to use a predictive function for predicting a plant condition based on test inputs, to generate growing recommendations for plants on a test farm area. The test farm area may be, but is not limited to, an outdoor area in which plants are grown (e.g., a field), an indoor area in which plants are grown (e.g., protected crops or greenhouses), or any other location in which plants are grown. Such plants may include, but are not limited to, fruits, trees, leaves, roots, crops, flowers, inflorescence, and so on. Based on the test inputs, information about the development of growing plants may be determined, including, but not limited to, diseases, yield predictions, harvest time predictions, and so on.

The sensor module 120 may be configured to acquire the test inputs having substantially the same input structure as the training inputs (or data used to derive the test inputs) and to transmit the test inputs to the recommendation module 110. The test inputs may include, but are not limited to, images, inputs from environmental sensors, and so on. In an embodiment, the test inputs may be derived from such images or environmental sensor inputs. For example, the test inputs may be determined based on a transformation applied to each image and/or environmental sensor input. In a typical embodiment, the images are high resolution images. The images may include stationary images i.e. images from a static viewpoint. Alternatively or collectively, the images may include dynamic images and/or videos.

Alternatively or collectively, the test inputs may include other land information related to plant growth such as, but not limited to, soil type, soil measurements (e.g., salinity, pH, etc.), seed type, sowing time, amount and scheduling of irrigation, type and scheduling of fertilizer, type and scheduling of pesticides and/or insecticides, and so on. In an embodiment, the recommendation module 110 may receive the land information from an input device 115, which may be, but is not limited to, a user input device.

In an embodiment, the sensor module 120 may include a high resolution imaging device (not shown). The imaging device may be stationary and may be configured to capture images of a test farm area including a plant. The imaging device may be a digital camera and may be configured to capture a test image sequence of the test farm area. The test image sequence may be, but is not limited to, a series of images captured sequentially from the same viewpoint with substantially similar optical characteristics. The images in the test image sequence may be captured periodically. Further, the time intervals between captured images may be sufficient to demonstrate stages of plant development and may be, but are not limited to, minutes, hours, days, weeks, and so on. The resolution of the test images is sufficient to identify one or more plant parts of the plant.

The sensor module 120 may include a processing unit for processing the data acquired by the sensor module 120 and a communication unit for enabling communication with the recommendation module 110 over a telecommunication network. The recommendation module 110 and the sensor module 120 may be configured to communicate using a wireless communication data link such as a 3G or a Wifi connection.

The sensor module 120 may optionally include an environmental sensor 125. The environmental sensor 125 may further include a plurality of environmental sensor units (not shown) such as, but not limited to, a temperature sensor unit, a humidity sensor unit, a soil moisture sensor unit, a sunlight sensor unit, an irradiance sensor unit, and so on. In some embodiments, the plurality of environmental sensor units may be housed in a single sensor module housing (not shown). In another embodiment, the environmental sensor units may be spatially distributed but communicatively connected to the communication unit of the sensor module 120.

The sensor module 120 may be configured to obtain a series of one or more environmental parameter values. Preferably, the sensor module 120 may be configured to measure the environmental parameter values. In some embodiments, the sensor module 120 may be autonomously powered, for example using a solar panel. In some embodiments, the time intervals between the test images acquired (and optionally between the acquired environmental parameters) may depend on the powering capabilities of the sensor module 120. As an example, if a sensor module having higher power capabilities may capture test images more frequently than a sensor module having lower power capabilities. Similarly, in an embodiment, the resolution of at least one test image may depend on the powering capabilities of the sensor module 120. In some embodiments, the resolution of the test images may be dynamically adapted in accordance with the powering capabilities of the sensor module 120. Thus, the resolution of the test images may vary depending upon the current power capabilities of the sensor module 120 at any given time. Such power capabilities may change when, for example, the sensor module 120 is connected to a different power source, the sensor module 120 is replaced, and so on. In some embodiments, a resolution of the test images acquired may be altered to lower the amount of data communicated to the recommendation module 110, thereby decreasing power consumption of the sensor module 120.

In an embodiment, the sensor module 120 may be further configured to switch on/off in accordance with a predetermined time schedule based on the predetermined image frequency and, optionally, on the predetermined environmental parameter frequencies of the test inputs so that the sensor module may only be switched on when it is acquiring data. This switching between off and on may enable reduced power consumption by the sensor module 120.

In an embodiment, the sensor module 120 may be configured to preprocess the captured test inputs. For example, the sensor module 120 may downsize the images acquired via an imaging device. In a further embodiment, the preprocessing may include utilizing an optical flow algorithm.

In an embodiment, the recommendation module 110 may be communicatively connected to the classifier module 130, thereby allowing the recommendation module 110 to apply a predictive function determined by the classifier module 130 to the test inputs captured via the sensor module 120. The classifier module 130 may be configured to generate a predictive function based on a training set including training inputs linked to training outputs. The estimation of the predictive function (model) may be performed preliminarily.

To enable determination of which predictive function the recommendation module should use, the classifier module 130 may be configured to generate the predictive function based on training sets by using machine learning techniques. For example, the classifier module 130 may use convolutional neural network layer(s) optionally combined with feed forward neural network layer(s) to estimate the predictive function "f." Thus, in an exemplary embodiment, building the classifier may include, but is not limited to: building matrixes from the training image sequences based on an image pixel abscissa, an image pixel ordinate, an image pixel color, and/or an image index; and feeding the matrixes to one or more (e.g. 5) layers of convolutional neural network with one or more (e.g. 3) other fully connected layers.

The recommendation module 110 may further be configured to output a growing recommendation respective of the test farm area to the output module 140. The growing recommendation may be based on the predicted plant condition. For example, the recommendation module 110 may process the predicted plant condition in order to determine whether certain actions may be advised such as, but not limited to, using fertilizer, increasing water irrigation, alerting a farmer, and so on. In some embodiments, the output module 140 may include or may be included in a mobile communication device (not shown) used for displaying the growing recommendation. In another embodiment, the output module 140 may transmit the growing recommendation to a remote device via, e.g., a transmission module (not shown). In some embodiments, the growing recommendation may also be uploaded on a website.

In another embodiment, the growing recommendation may be provided to an automatic plant care system (not shown) configured to control farm area conditions such as, e.g., humidity, temperature, watering schedule, fertilizing schedule, insecticide/pesticide schedule, and so on. Such an automatic plant care system may, therefore, allow for at least part of the actions required to grow the plants to be performed automatically and without human intervention.

In some embodiments, the system 100 may further include a database 170. The database 170 may be configured to store the generated predictive function. Alternatively or collectively, the generated predictive function may be stored on a remote server. The database 170 may further include the training set.

It should be noted that the sensor module 120 is included in the system 100 merely for simplicity purposes and without limitations on the disclosed embodiments. In an embodiment, the sensor module 120 may be remote from the system 100 and may transmit sensor data via, e.g., telecommunication, radio, the Internet, and so on.

The processing unit 150 may comprise or be a component of a processor (not shown) or an array of processors coupled to the memory 160. The memory 160 contains instructions that can be executed by the processing unit 150. The instructions, when executed by the processing unit 150, cause the processing unit 150 to perform the various functions described herein. The one or more processors may be implemented with any combination of general-purpose microprocessors, multi-core processors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

Figure 2:
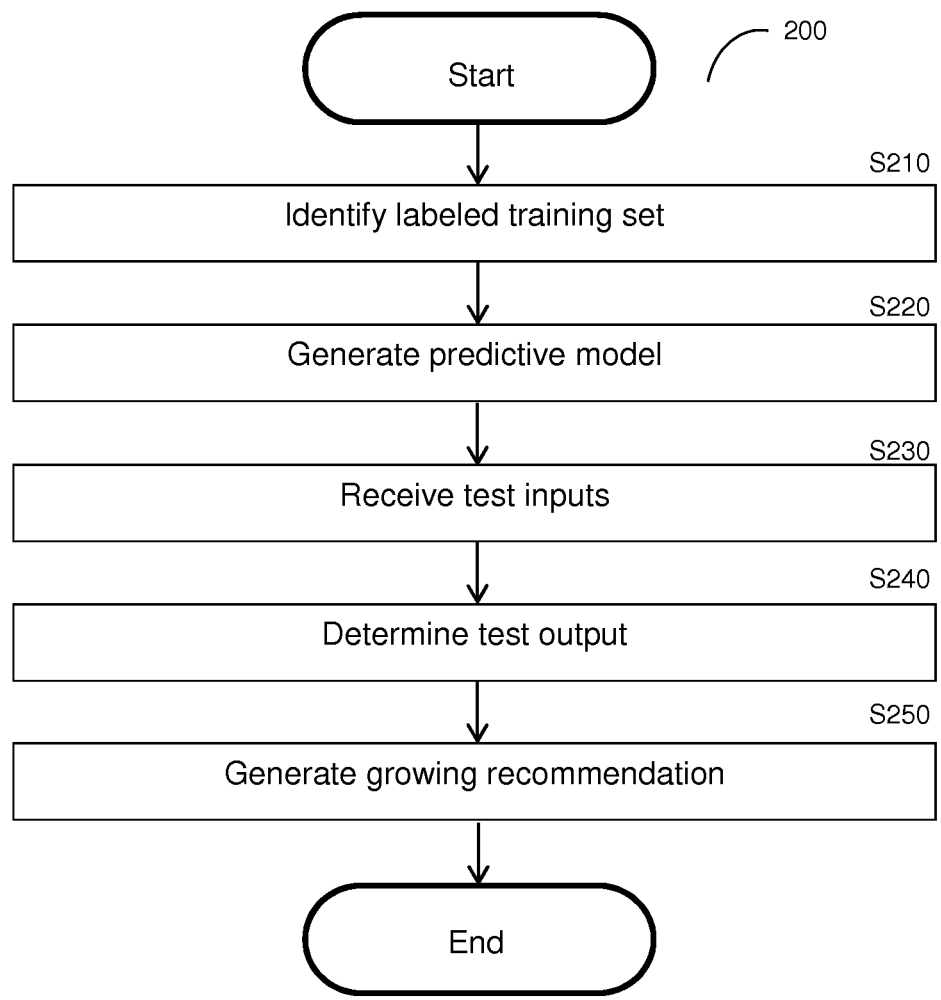
FIG. 2 is a flowchart illustrating a method for automatic plant monitoring according to an embodiment.

FIG. 2 shows a flowchart 200 illustrating a method for automatic plant monitoring according to an embodiment. In optional S210, a labeled training set may be identified. The training set may include one or more training inputs such as, but not limited to, a sequence of training images of a farm area containing a plant, an environmental sensor input, a transformation thereof, and so on. The training set may further include training outputs such as, e.g., a plant condition as of the capturing of the training inputs, a plant condition after training input capture, and so on. The training inputs may have a predetermined input structure as described further herein above with respect to FIG. 1.

In an embodiment, the training set may be retrieved or generated and labeled. In a further embodiment, the training inputs may be labeled automatically based on, e.g., analysis of the training inputs. For example, the labeling may be based on image processing of a sequence of training images. In another embodiment, the training inputs may be labeled manually, i.e., based on a user input regarding the plant featured therein.

In an embodiment, any of the training inputs may be labeled based on an analysis conducted during input capture. For example, a plant condition may be visible in the training image sequence. In another embodiment, any of the training inputs may be labeled based on an analysis of post-input capture information. For example, the labeled plant condition may be derived from information available subsequent to the capture of the last image of the training image sequence. This may enable labeling of training sequences with future plant conditions of plants monitored in the training phase and allows, in the test phase, for early detection of tendencies toward particular plant conditions. Thus, the training inputs may be labeled so as to note indicators of subsequent disease. For example, the training input labels may identify fungal fruiting bodies indicative of future diseases caused by the fungus (e.g., damping off, mildew formation, cankers, and so on).

The training inputs to be labeled may be captured using, for example, stationary high resolution cameras placed in one or more farms, a terrestrial or aerial drone including a camera operated in the farms, a camera mounted to a rail or terrestrial vehicle on the farms, environmental parameter sensors (e.g., temperature, humidity, and/or irradiance sensors), and so on. The labels may include, but are not limited to, a health state, a plant yield at harvest, and/or a maturity parameter of the plant indicating the state of the plant relative to its initial and ready-for-harvesting forms. The training inputs may include images such as, for example, an extended sequence of images, a sequence of images extracted from an extended sequence of images, and/or images extracted from a video stream. The images may further be extracted based on, e.g., a predetermined sampling scheme. For example, the training image sequences may include between 2 and 20 training images.

The training sequence may further include environmental parameter values. The environmental parameter values may be associated with a training image sequence. The environmental parameter values may further relate to time periods beyond the time periods in which the training images were captured. For example, an environmental parameter value associated with a sequence of training images may be a projection value relating to a later time period.

The training images may further indicate specific parts of a plant. Such indication may be useful in identifying plant conditions related only to specific parts of the plant. For example, for disease detection of tomato yellow leaf curl virus (TYLCV), upper new leaves (i.e., the youngest leaves of the plant) may be specifically identified in the training images (and, accordingly, in subsequent test images). As a result, specific parts of the plant may be analyzed to determine plant conditions. Moreover, the training images may include multiple plants, and appropriate image processing may be performed respective of the plants.

In S220, a predictive model is generated based on the labeled training inputs. In an embodiment, the predictive model may be generated based on convolutional neural networks. The steps S210 and S220, collectively, may be utilized to build a classifier as described further herein above with respect to the classifier module 130 of FIG. 1.

In S230, one or more test inputs is received or retrieved. In an embodiment, the test inputs may include a sequence of images and/or environmental parameters. Alternatively or collectively, the test inputs may include other information related to plant growth such as, but not limited to, soil type, soil measurements (e.g., salinity, pH, etc.), seed type, sowing time, amount and scheduling of irrigation, type and scheduling of fertilizer, type and scheduling of pesticides and/or insecticides, and so on.

In S240, a test output is determined based on the test inputs. The test output may be, but is not limited to, a plant condition. Plant conditions may include, but are not limited to, a current or future disease of the plant, a harvest yield, and a harvest time. In particular, one such plant condition may be blight. Blight is a common fungus disease in tomato and potato plants. Although commonly detected in later stages based on identifying brown-gray necrosis areas forming on infected parts, the test output may indicate late blight in earlier stages based on the test inputs and the training sets. Use of environmental parameters such as temperature, humidity, soil moisture, and/or radiation intensity may further increase accuracy of the test output. In an embodiment, the test output is determined by applying the predictive function to the test inputs.

In S250, a growing recommendation is generated based on the test output. As described above, the growing recommendation may be related to watering, fertilizing, and or applying pesticide/insecticide to the plant. In an embodiment, S250 may further include generating a notification including the growing recommendation. The notification may be sent to, e.g., a mobile device of an owner of the farm area. The notification may also be uploaded to a website.

It should be noted that, in some embodiments, the steps S210 and S220 may be performed offline and/or at a remote time from the other steps of the method of FIG. 2. In an embodiment the training input labeling and approximation of predictive functions may be performed only once initially, and may be repeated only as desired to determine, e.g., plant conditions of new types of plants, newly identified plant conditions, and so on.

Figure 3A:
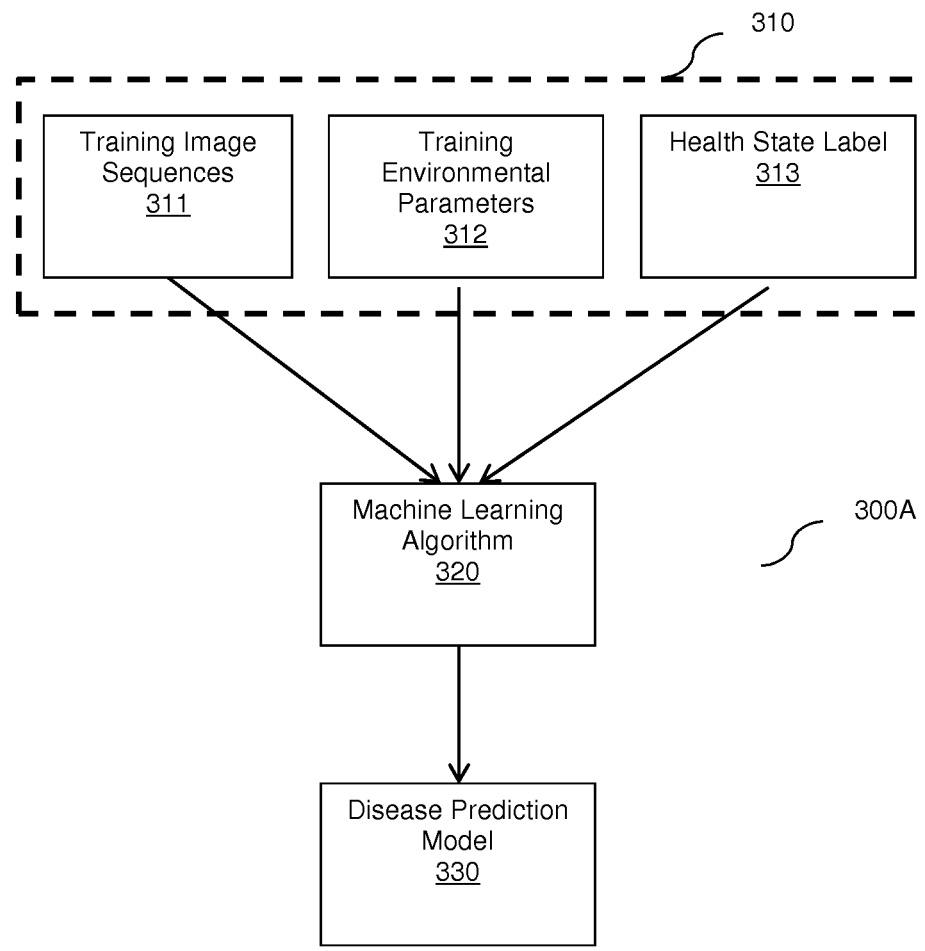
FIGS. 3A-3C are flow diagrams illustrating predictions of diseases, health states, and diseases based on automatic plant monitoring according to embodiments.
Figure 3B:
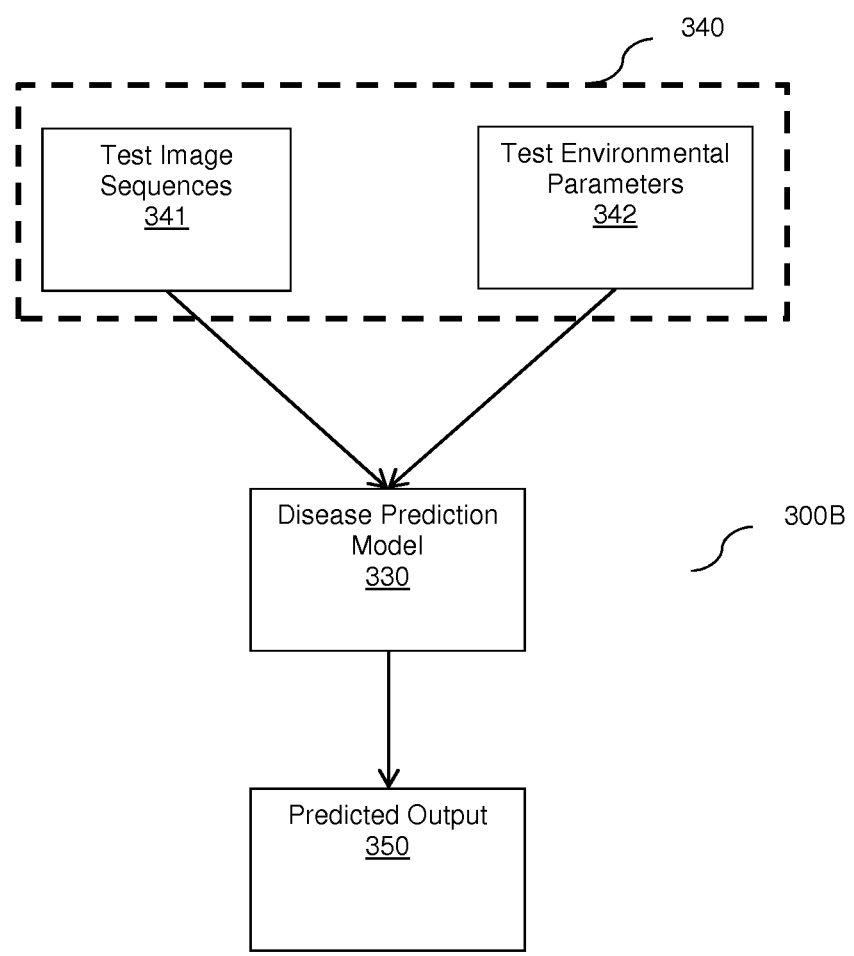
Figure 3C:
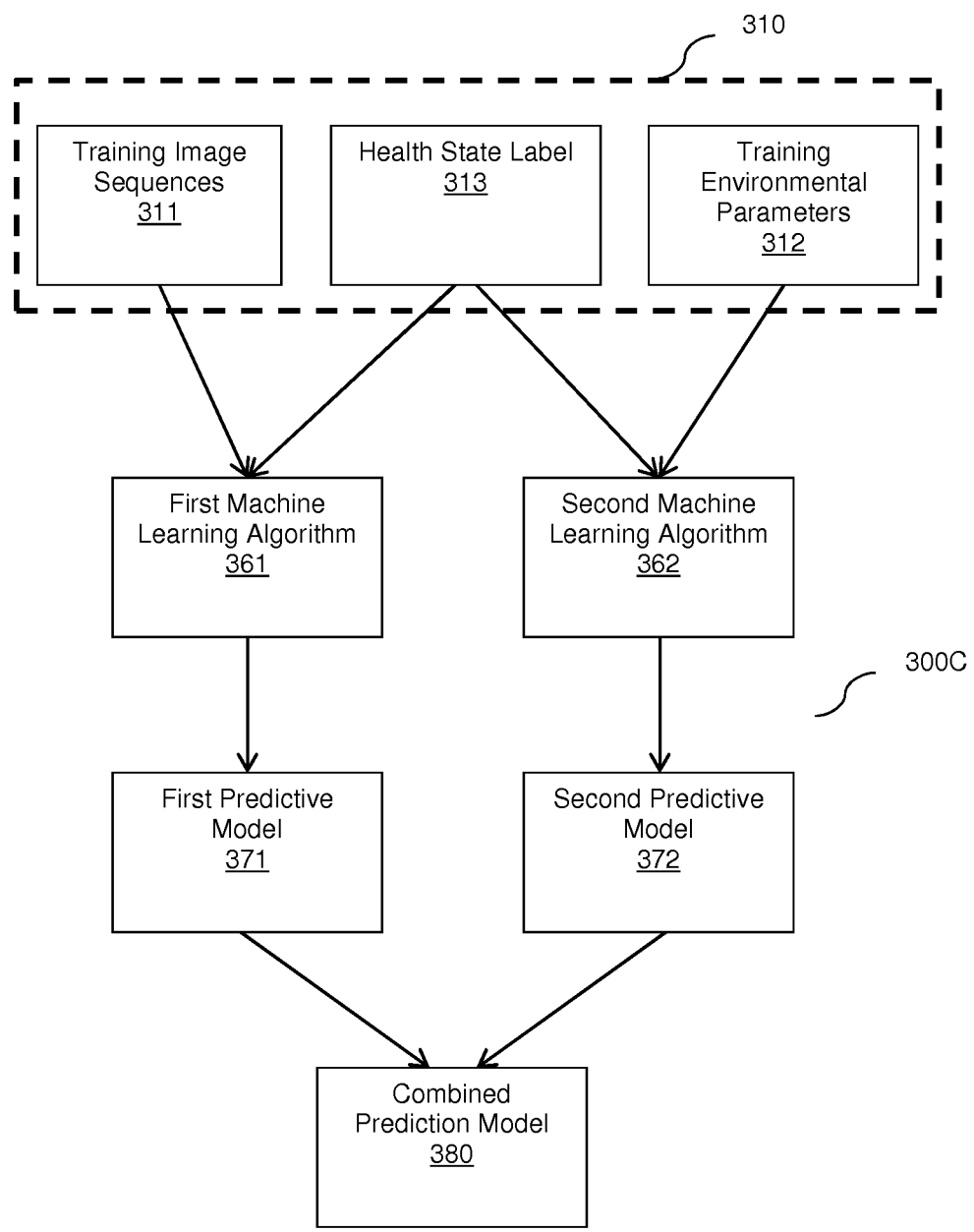

FIGS. 3A-3C show flow diagrams 300A, 300B, and 300C illustrating a training phase, a test phase, and an alternate training phase, respectively, of a method for predicting plant diseases according to an embodiment.

Flow diagram 300A illustrates feeding a labeled training set 310 to a machine learning algorithm 320 for building a disease prediction model 330. The labeled training set 310 includes sequences training inputs such as training image sequences 311 featuring farm areas containing plants and a training environmental parameter sequence 312. The labeled training set 310 further includes training outputs such as plant conditions provided via a health state label 313 corresponding to a health state of a plant featured in the labeled training set. In some embodiments, the health state of the plant may further include indicators of potential future plant conditions. In an embodiment, the health state label 313 may be a binary value (e.g., healthy or sick). In another embodiment, the health state label 313 may be a categorical variable (e.g., healthy, has disease A, has disease B, has early indicators of disease C, and so on).

The training set 310 may be fed into the machine learning algorithm 320 to train a disease prediction model 330 (e.g., a predictive function) which can be subsequently used to predict outputs (such as, e.g., plant conditions) based on incoming test inputs. In an embodiment, the disease prediction model 330 may further provide a risk score indicating the likelihood that the predicted outputs are accurate. In some embodiments, the disease prediction model 330 may be a convolutional neural network.

Flow diagram 300B illustrates a test phase of a method or automatic plant monitoring to predict current or potential future diseases according to an embodiment. The prediction is based on the disease prediction model 330 obtained during a training phase. A test input set 340 is provided to the disease prediction model 330 to obtain a predicted output 350. The test input set 340 may include sequences of test inputs such as a test image sequence 341 of a test farm area containing a plant and a test environmental parameter sequence 342. The test input set 340 may be transmitted from a stationary sensor module installed in the test farm area. Each test input of the test input set 340 may have the same input structure as a respective training input of the training input set 310. The predicted output 350 may include one or more risk scores indicating probabilities that the health state of the plant of the test input set 340 has a particular health state. In an embodiment, the predicted output 350 may further be utilized to generate a growing recommendation for the test farm area.

Flow diagram 300C illustrates an alternative training phase to the training phase illustrated in FIG. 3A. A first predictive model 371 is generated using a first machine learning algorithm 361 based on the training image sequence 311 and the health label 313. A second predictive model 372 is generated using a second machine learning algorithm 362 based on the training environmental parameters sequence 312 and the health label 313. The first and second predictive models 371 and 372 may each be associated with risk scores. The predictive models 371 and 372 may be combined to generate a combined predictive model 380. In an embodiment, the combination may include combining risk scores for the first and second predictive functions (e.g., via averaging, using weighted averages, and so on).

It should be noted that the alternative training phase described with respect to FIG. 3C is based on a disease prediction merely for simplicity purposes and without limitation on the disclosed embodiments. The alternative training phase may be utilized for other plant conditions (e.g., harvest yield, harvest time, and so on) without departing from the scope of the disclosure.

Figure 4A:
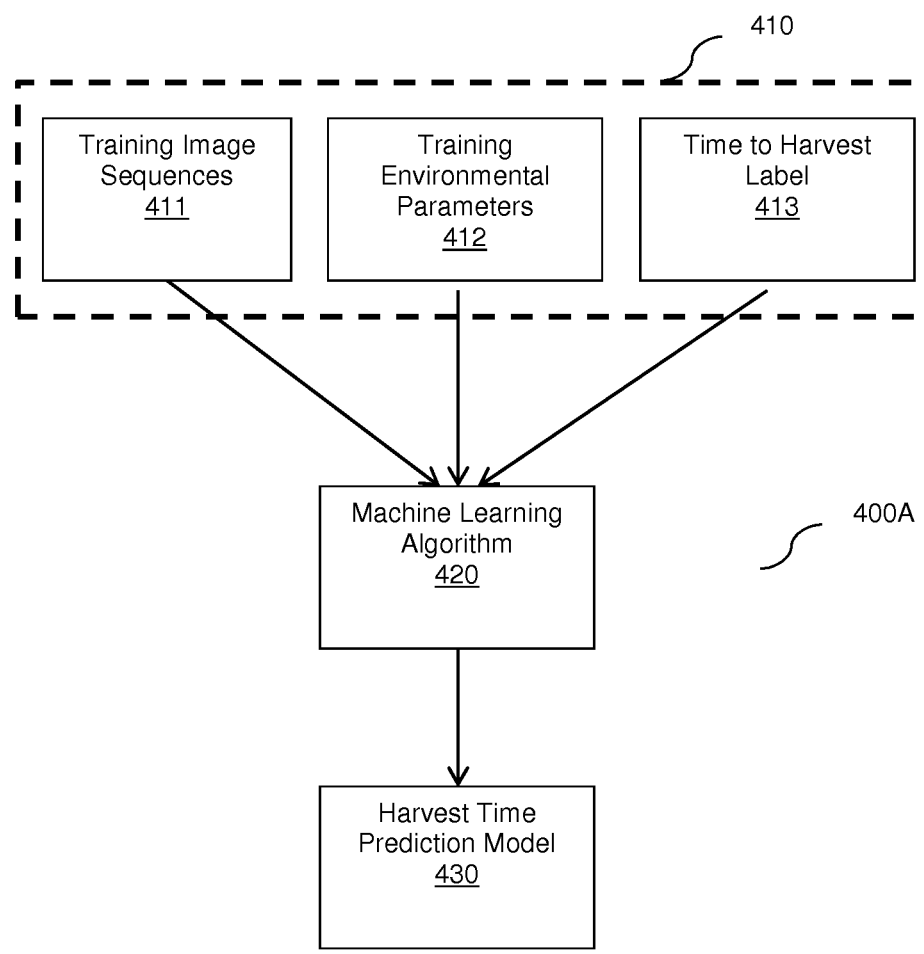
FIGS. 4A and 4B are flow diagrams illustrating a training phase and a test phase, respectively, of a method for predicting harvest time based on automatic plant monitoring according to an embodiment.
Figure 4B:
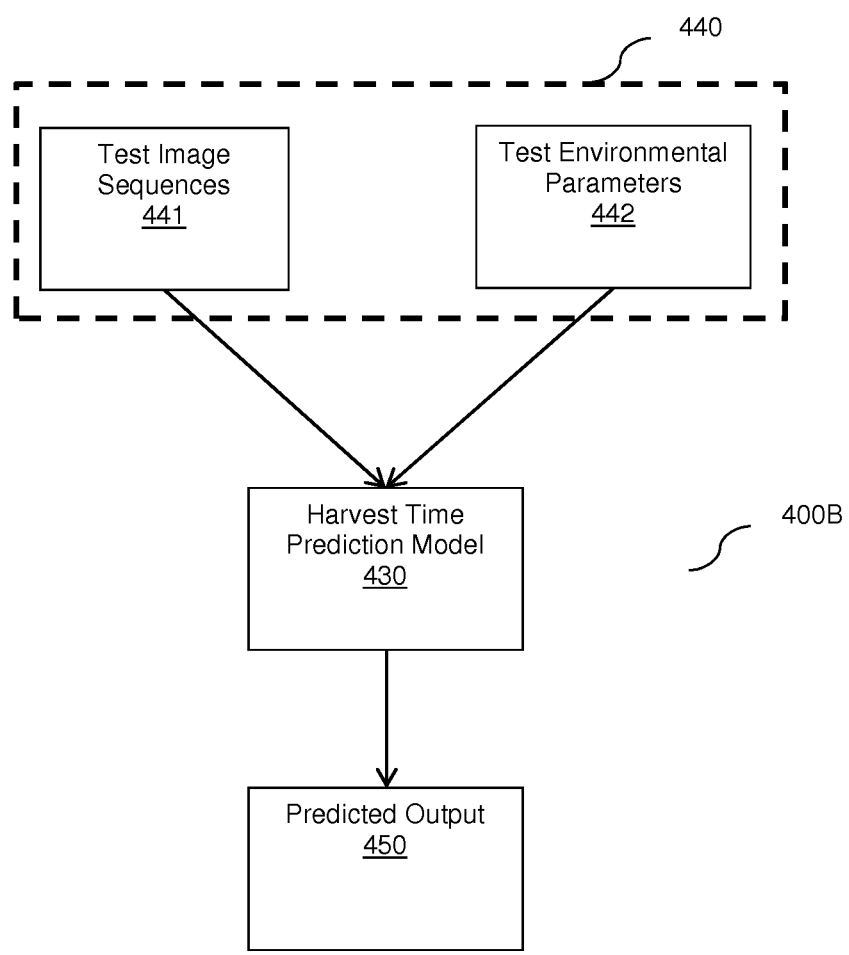

FIGS. 4A and 4B illustrate phases of a method for plant monitoring to predict harvest times according to an embodiment.

FIG. 4A shows a flow diagram 400A illustrating a training phase of a method for plant monitoring to predict harvest times according to an embodiment. A labeled training set 410 is fed to a machine learning algorithm 420 to generate a harvest time prediction model 430.

The labeled training set 410 includes sequences of training inputs such as training image sequence 411 featuring farm areas containing plants as well as a training environmental parameter sequence 412. The training environmental parameter sequence 412 may include, but is not limited to, values of humidity, temperature, soil moisture, radiation intensity, sunlight, subsequent meteorological forecasts, and so on. In another embodiment, the environmental parameters may related to a greenhouse including the farm area. The labeled training set 410 also includes training outputs such as a time to harvest label 413 indicating a maturity of the plant based on the most recent image of the training image sequence 411. The maturity may be expressed as a time difference between the time of capture of the most recent image of the training image sequence 411 and a determined harvest time for the plant. The time to harvest may be a real-valued scalar. In an embodiment, the training image sequence 411 may include continuous imaging of plants from an initial stage (e.g., planting, flowering, and so on) to a harvest stage. In an embodiment, the environmental parameters 412 may be collected at the same or substantially the same time as the training image sequence 411. The labeled training set 410 may be sample based on, e.g., a predefined sampling scheme.

Upon feeding the training set 410 to the machine learning algorithm 420, a time to harvest model 430 may be generated. The time to harvest model 430 may be utilized to predict times of harvest based on subsequent test inputs. The time to harvest model 430 may further provide risk scores indicating likelihoods that the predicted harvest times are accurate. In an embodiment, the machine learning algorithm 420 is a convolutional neural network.

FIG. 4B shows a flow diagram 400B illustrating a training phase of a method for plant monitoring to predict harvest times according to an embodiment. A predicted output 450 is generated based on a test input set 440 and the time to harvest model 430.

The test input set 440 may include sequences of test inputs such as a test image sequence 441 of a test farm area containing a plant and a test environmental parameter sequence 442. The test input set 440 may be transmitted from a stationary sensor module installed in the test farm area. Each test input of the test input set 440 may have the same input structure as a respective training input of the training input set 410. The predicted output 450 may include a predicted harvest time and a risk score indicating a probability that the predicted harvest time is accurate.

Figure 5A:
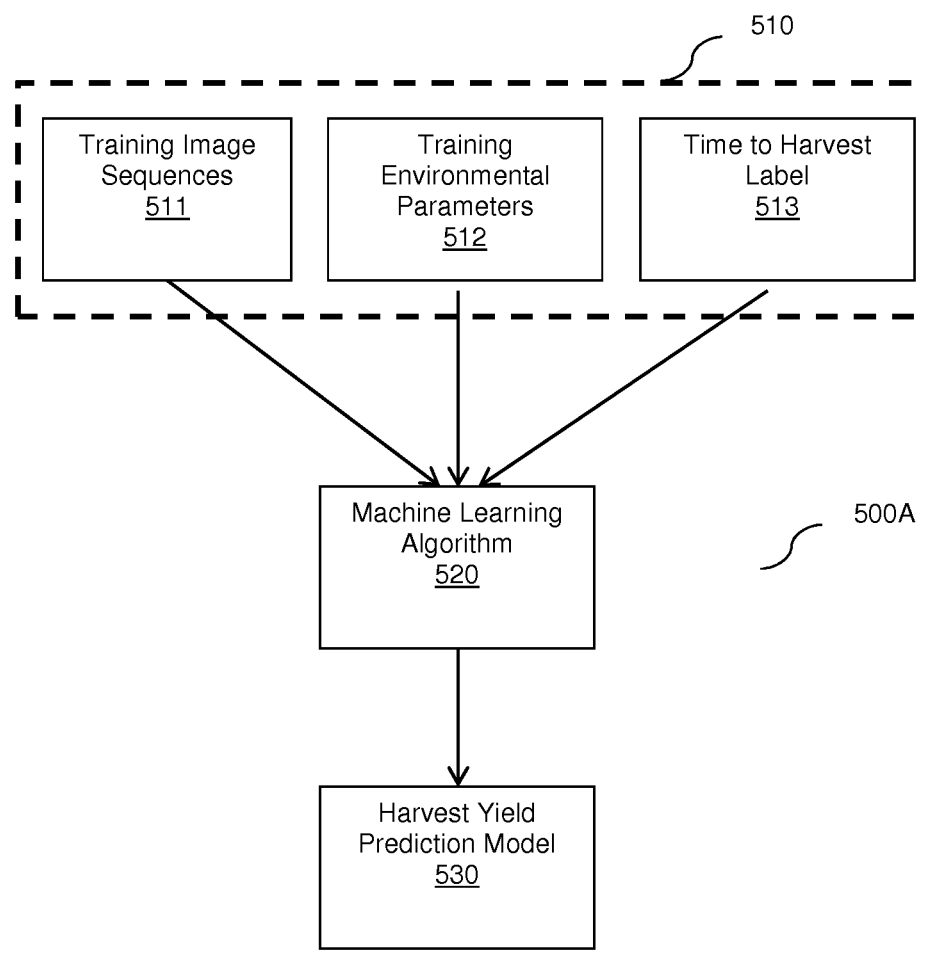
FIGS. 5A and 5B are flow diagrams illustrating a training phase and a test phase, respectively, of a method for predicting harvest yields based on automatic plant monitoring according to an embodiment.
Figure 5B:
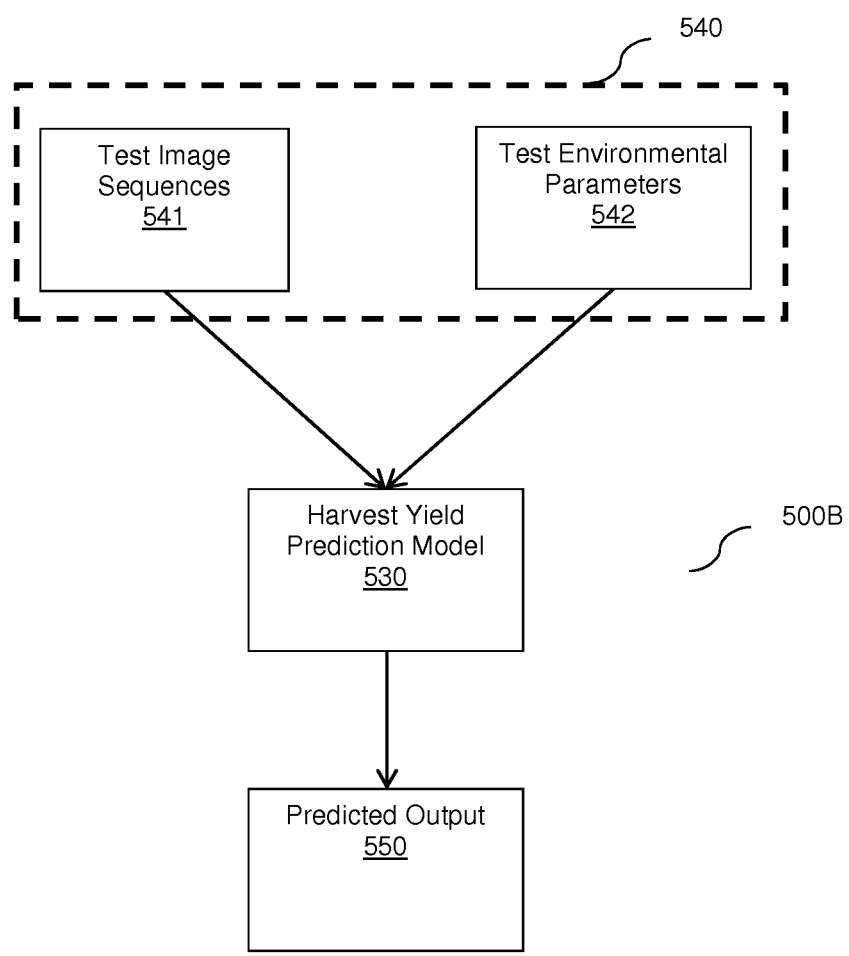

FIGS. 5A and 5B illustrate phases of a method for plant monitoring to predict harvest yields according to an embodiment.

FIG. 5A shows a flow diagram 500A illustrating a training phase of a method for plant monitoring to predict harvest yields according to an embodiment. A labeled training set 510 is fed to a machine learning algorithm 520 to generate a harvest time prediction model 530.

The labeled training set 510 includes sequences of training inputs such as training image sequence 511 featuring farm areas containing plants as well as a training environmental parameter sequence 512. The environmental parameter sequence 512 may include, but are not limited to, values of humidity, temperature, soil moisture, radiation intensity, sunlight, subsequent meteorological forecasts, and so on. The labeled training set 510 also includes training outputs such as a time to harvest label 513 indicating a yield of the plant at a future harvest time. The yield of the plant may be expressed as a plant yield at the harvest time. For example, the plant yield may be measured based on a quantity of plant parts (e.g., fruits), a total weight of yield, a total volume of yield, and so on. The yield may be a real-value scalar. The training image sequences may be collected via continuous monitoring from an initial stage (e.g., flowering) to harvest. In an embodiment, the environmental parameters 512 may be collected at the same or substantially the same time as the training image sequence 511. The labeled training set 510 may be sample based on, e.g., a predefined sampling scheme.

Upon feeding the training set 510 to the machine learning algorithm 520, a harvest yield prediction model 530 may be generated. The harvest yield model 530 may be utilized to predict times of harvest based on subsequent test inputs. The harvest yield model 530 may further provide risk scores indicating likelihoods that the predicted harvest times are accurate. In an embodiment, the machine learning algorithm 520 is a convolutional neural network.

FIG. 5B shows a flow diagram 500B illustrating a training phase of a method for plant monitoring to predict harvest yields according to an embodiment. A predicted output 550 is generated based on a test input set 540 and the harvest yield model 530.

The test input set 540 may include sequences of test inputs such as a test image sequence 541 of a test farm area containing a plant and a test environmental parameter sequence 542. The test input set 540 may be transmitted from a stationary sensor module installed in the test farm area. Each test input of the test input set 540 may have the same input structure as a respective training input of the training input set 510. The predicted output 550 may include a predicted harvest yield and a risk score indicating a probability that the predicted harvest yield is accurate. In an embodiment, the predicted harvest yield may further be utilized to generate a growing recommendation. In a further embodiment, the growing recommendation may be aimed at maximizing yield. In some embodiments, the growing recommendation may only be generated if, e.g., a difference between the predicted yield and an expected yield is above a predefined threshold. Such a difference may be determined respective of normal growth patterns as described further herein below with respect to FIG. 6.

Figure 6:
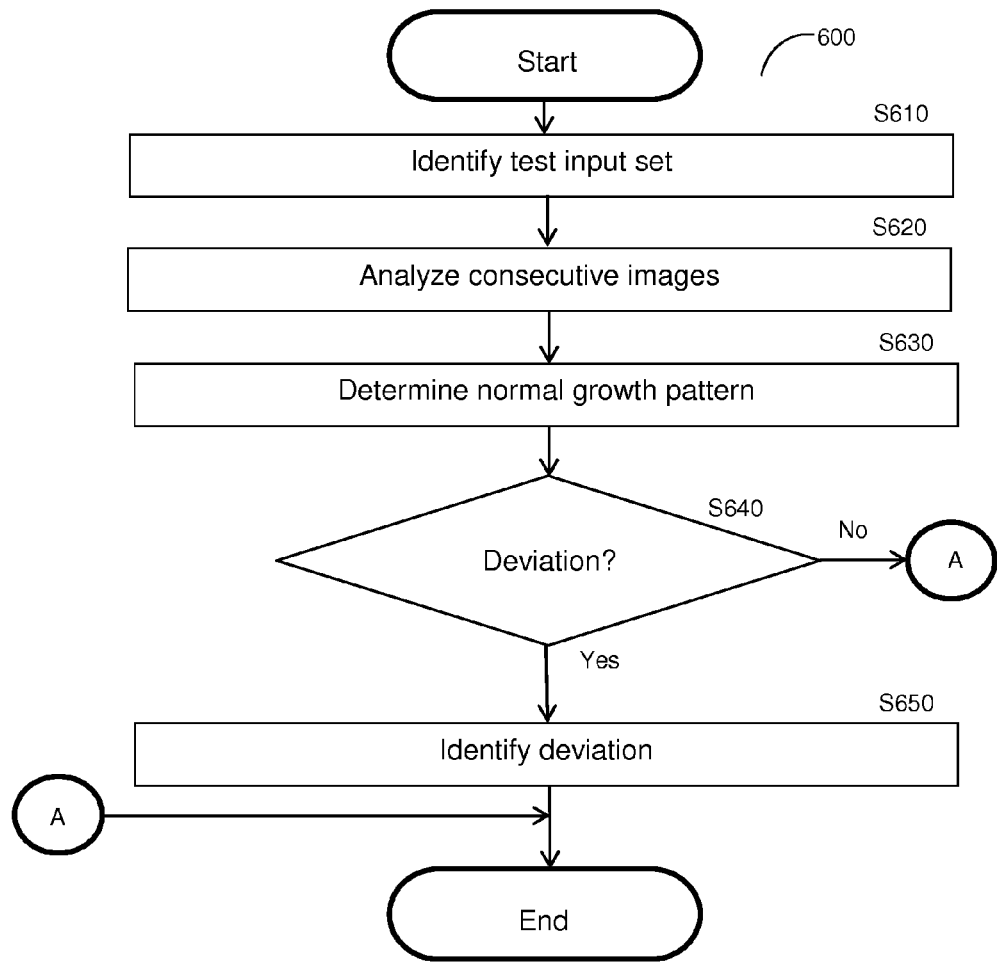
FIG. 6 is a flowchart illustrating a method for identifying deviations from common growth patterns according to an embodiment.

FIG. 6 is an exemplary flowchart 600 illustrating a method for automatic plant monitoring and identification of deviations from normal growth patterns based on image analysis according to an embodiment. In S610, a test input set is identified respective of a farm area including a plant. The test input may include a test image sequence of images featuring the test farm area. The identified test input set may be an existing input set received from a storage, or may be generated using one or more sensors (such as the sensors of the sensor module 120).

In S620, at least two consecutive images of the test image sequence are analyzed. The analysis may include image processing such as, e.g., machine vision. The analysis includes identifying a time of capture for each analyzed image. In an embodiment, the analysis may result in identification of a type of the plant and/or a stage of development of the plant. The analysis may result in identification of plant features such as, but not limited to, a number of leaves or branches, colors of various plant parts, a size of the plant, a size of a fruit of the plant, a maturity of the plant, and so on.

In S630, based on the times of capture of the analyzed images, a normal growth pattern of the plant at the times of capture is determined. The normal growth pattern indicates the appearance or change of certain plant features at various points in the plant's development. For example, the normal growth pattern may indicate features such as, for various points in time, an expected number of leaves, number of branches, color of plant parts, size of the plant, size of a fruit, a maturity, and so on.

In S640, based on the analysis, it is checked whether the identified plant features deviate from the normal growth pattern and, if so, execution continues with S650; otherwise, execution terminates. In an embodiment, the identified plant features may deviate from the normal growth pattern if, e.g., the difference between one or more of the plant features and the respective normal growth pattern features is above a predetermined threshold. In a further embodiment, the difference between the plant features and the respective normal growth pattern features may be averaged or subject to a weighted average. In such an embodiment, a deviation may be determined if the average or weighted average is above a predetermined threshold.

In S650, a deviation from the normal growth pattern is identified. In an embodiment, S650 may include generating a notification regarding the deviation. The notification may further include a corrective action and/or a growing recommendation.

It should be noted that the method of FIG. 6 may be iteratively repeated, thereby allowing for continuous monitoring of deviations. Such continuous monitoring allows for improved identification of potential growth issues and more rapid responses to such issues.

It should be noted that the term "plant," as used herein, may refer to a whole plant, to a part of a plant, and/or to a group of plants.

It should further be noted that, as described herein, the term "machine learning techniques" may be used to refer to methods that can automatically detect patterns in data and use the detected patterns to predict future data and/or perform any other decision-making in spite of uncertainty. In particular, the present disclosure relates to supervised learning approaches in which inputs are linked to outputs via a training data set.

The training set may include a high number of training examples (e.g., pairings of training inputs and outputs). Each input may be associated with environmental parameters such as, but not limited to, temperature, humidity, radiation intensity, sunlight, subsequent meteorological forecasts, and so on. In some embodiments, the inputs may preferably have a similar predetermined training input structure. For example, the input structure for an image input may include an image parameter and an image frequency parameter. The image parameter may indicate an amount of successive images in an image sequence. The image frequency parameter may indicate one or more time intervals between successive captures of images of an input. The time intervals may be the same (e.g., when images are captured periodically) or different.

The input structure for an environmental parameter may include corresponding environmental parameters and environmental frequency parameters. Each environmental parameter may indicate an amount of successive values of a given environmental parameter. Each environmental frequency parameter may indicate one or more time intervals between successive captures of environmental parameters of an input. The time intervals may be the same (e.g., when environmental parameters are captured periodically) or different.

The training outputs may be a categorical variable such as, but not limited to, a disease category. Alternatively or collectively, the training outputs may include a binary indication of whether the plant appears healthy or sick and/or may define several classes such as a list of potential diseases the plant may have. Generally, the machine learning techniques may be formalized as an approximation of a function (e.g., "$y=f(x)$," wherein x is an input, y is an output, and f is a function applied to x to yield y). Such machine learning techniques may be utilized to make predictions using an estimated function (e.g., "$\hat{y}=\hat{f}(x)$," where $\hat{y}$ is the approximated output, x is the input, and $\hat{f}$ is the approximated function). Such function approximation enables prediction of new test inputs. The approximation may further provide a risk score indicating a likelihood that the approximated output is correct.

Each test input may have the same input structure as one or more training inputs. Thus, the test input may have the same number of input parameters as that of a training input, and the parameters may be taken at similar time intervals. The training inputs may be included in a training set, which may be collected prior to capturing of the test inputs. The training inputs may be obtained directly (i.e., they may include captured images and/or environmental sensor inputs) or indirectly (i.e., they may be transformed from captured images and/or environmental sensor inputs).

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for automatic plant monitoring, comprising:
identifying at least one test input respective of a test area, wherein the test area includes at least one part of a plant; and
generating a plant condition prediction based on the at least one test input and using a prediction model, wherein the prediction model is trained using a machine learning algorithm based on a training set including a plurality of training inputs and a plurality of training outputs, each training output corresponding to a set of at least one of the plurality of training inputs, wherein each training output corresponds to one of the plurality of training inputs, wherein the at least one training output includes a plurality of plant condition labels, wherein each of the plurality of plant condition labels is generated based on an analysis of post-input capture information for the corresponding set of at least one training input.

2. The method of claim 1, wherein the plant condition prediction is any of: a current disease, insect and pest activity, deficiencies in elements, a future disease, a harvest yield, and a harvest time.

3. The method of claim 1, further comprising:
generating a growing recommendation based on the plant condition prediction.

4. The method of claim 3, further comprising any of:
causing a display of the growing recommendation;
transmitting the growing recommendation to a client device; and
uploading the growing recommendation to a website.

5. The method of claim 1, wherein each of the at least one test input and the at least one training input includes at least one of: an image sequence, and an environmental parameter.

6. The method of claim 5, wherein each environmental parameter is any of: temperature, humidity, soil moisture, insect and pest activity, radiation intensity, a subsequent meteorological forecast, and sunlight.

7. The method of claim 5, wherein each of the at least one test input and the at least one training input includes at least one projection.

8. The method of claim 5, wherein the prediction is further based on a secondary predictive model, wherein the secondary predictive model is based on the at least one training environmental parameter.

9. The method of claim 1, wherein the machine learning algorithm is a convolutional neural network.

10. The method of claim 1, further comprising:
determining a normal growth pattern of the plant, wherein a time period of the normal growth pattern matches a time period of a capture of the at least one test input;
determining a test growth pattern of the plant based on the at least one test input;
comparing the test growth pattern to the normal growth pattern; and
based on the comparison, determining whether the test growth pattern deviates from the normal growth pattern.

11. A non-transitory computer readable medium having stored thereon instructions for causing one or more processing units to execute the method according to claim 1.

12. A system for automatic plant monitoring, comprising:
a processing unit; and
a memory, the memory containing instructions that, when executed by the processing unit, configure the system to:
identify at least one test input respective of a test area, wherein the test area includes at least one part of a plant; and
generate a plant condition prediction based on the at least one test input and using a prediction model, wherein the prediction model is trained using a machine learning algorithm based on a training set including a plurality of training inputs and a plurality of training outputs, each training output corresponding to a set of at least one of the plurality of training inputs, wherein each training output corresponds to one of the plurality of training inputs, wherein the at least one training output includes a plurality of plant condition labels, wherein each of the plurality of plant condition labels is generated based on an analysis of post-input capture information for the corresponding set of at least one training input.

13. The system of claim 12, wherein the plant condition prediction is any of: a current disease, insect and pest activity, deficiencies in elements, a future disease, a harvest yield, and a harvest time.

14. The system of claim 12, wherein the system is further configured to:
generate a growing recommendation based on the plant condition prediction.

15. The system of claim 14, wherein the system is further configured to cause a display of the growing recommendation, to transmit the growing recommendation to a client device, or to upload the growing recommendation to a website.

16. The system of claim 12, wherein each of the at least one test input and the at least one training input includes at least one of: an image sequence, and an environmental parameter.

17. The system of claim 16, wherein each environmental parameter is any of: temperature, humidity, soil moisture, insect and pest activity, radiation intensity, a subsequent meteorological forecast, and sunlight.

18. The system of claim 16, wherein each of the at least one test input and the at least one training input includes at least one projection.

19. The system of claim 16, wherein the prediction is further based on a secondary predictive model, wherein the secondary predictive model is based on the at least one training environmental parameter.

20. The system of claim 12, wherein the machine learning algorithm is a convolutional neural network.

21. The system of claim 12, wherein the system is further configured to:
determine a normal growth pattern of the plant, wherein a time period of the normal growth pattern matches a time period of a capture of the at least one test input;
determine a test growth pattern of the plant based on the at least one test input;
compare the test growth pattern to the normal growth pattern; and based on the comparison, determine whether the test growth pattern deviates from the normal growth pattern.

22. The system of claim 12, further comprising:
a sensor module for capturing the at least one test input, wherein the sensor unit includes at least one of: a camera, and an environmental sensor.

23. The system of claim 22, wherein the environmental sensor is any of: a temperature sensor, a humidity sensor, and an irradiance sensor.

24. The method of claim 1, wherein the plurality of training inputs includes a plurality of training image sequences, each training image sequence having a last image in the sequence, wherein the post-input capture information for each set of at least one training input is available after capturing of the last image of one of the plurality of training image sequences.

25. The method of claim 1, wherein the plurality of plant condition labels includes a plurality of indicators of subsequent disease determined based on the post-input capture information for each set of at least one corresponding training input.

\* \* \* \* \*